United States Patent [19]

Axelsson

[11] 4,023,434
[45] May 17, 1977

[54] STEERING GEAR

[75] Inventor: Hans Inge Bengt Axelsson, Tranas, Sweden

[73] Assignee: Stiga AB, Tranas, Sweden

[22] Filed: June 25, 1975

[21] Appl. No.: 590,165

[30] Foreign Application Priority Data

June 26, 1974 Sweden .......................... 7408451

[52] U.S. Cl. .................................. 74/496; 74/222; 280/87 H; 280/97
[51] Int. Cl.² ........................................ B62D 1/20
[58] Field of Search ........... 74/222, 496; 280/87 R, 280/87 H, 92, 93, 94, 97

[56] References Cited

UNITED STATES PATENTS

| | | | |
|---|---|---|---|
| 935,610 | 9/1909 | Mauksch | 74/496 X |
| 993,194 | 5/1911 | Pence, Jr. | 74/496 X |
| 3,669,466 | 6/1972 | Spence | 74/496 |

*Primary Examiner*—Allan D. Herrmann
*Attorney, Agent, or Firm*—Beveridge, DeGrandi, Kline & Lunsford

[57] ABSTRACT

A steering gear of the type comprising a pulley rotatable by means of a steering wheel, and a member to be steered by wire ropes extending from the pulley, is arranged to provide a restoring moment. The rotatable pulley is formed with two adjoining grooves having a width corresponding to the cross-sectional dimension of the respective wire ropes, and a depth permitting at least two turns of wire rope to be wound thereinto. The restoring moment is obtained in that when steering movements are effected the run of the wire rope being wound onto the pulley and extending tangentially thereof will be situated at an effective radial distance from the center of the pulley greater than that of the corresponding run of the wire rope being unwound from the pulley.

4 Claims, 7 Drawing Figures

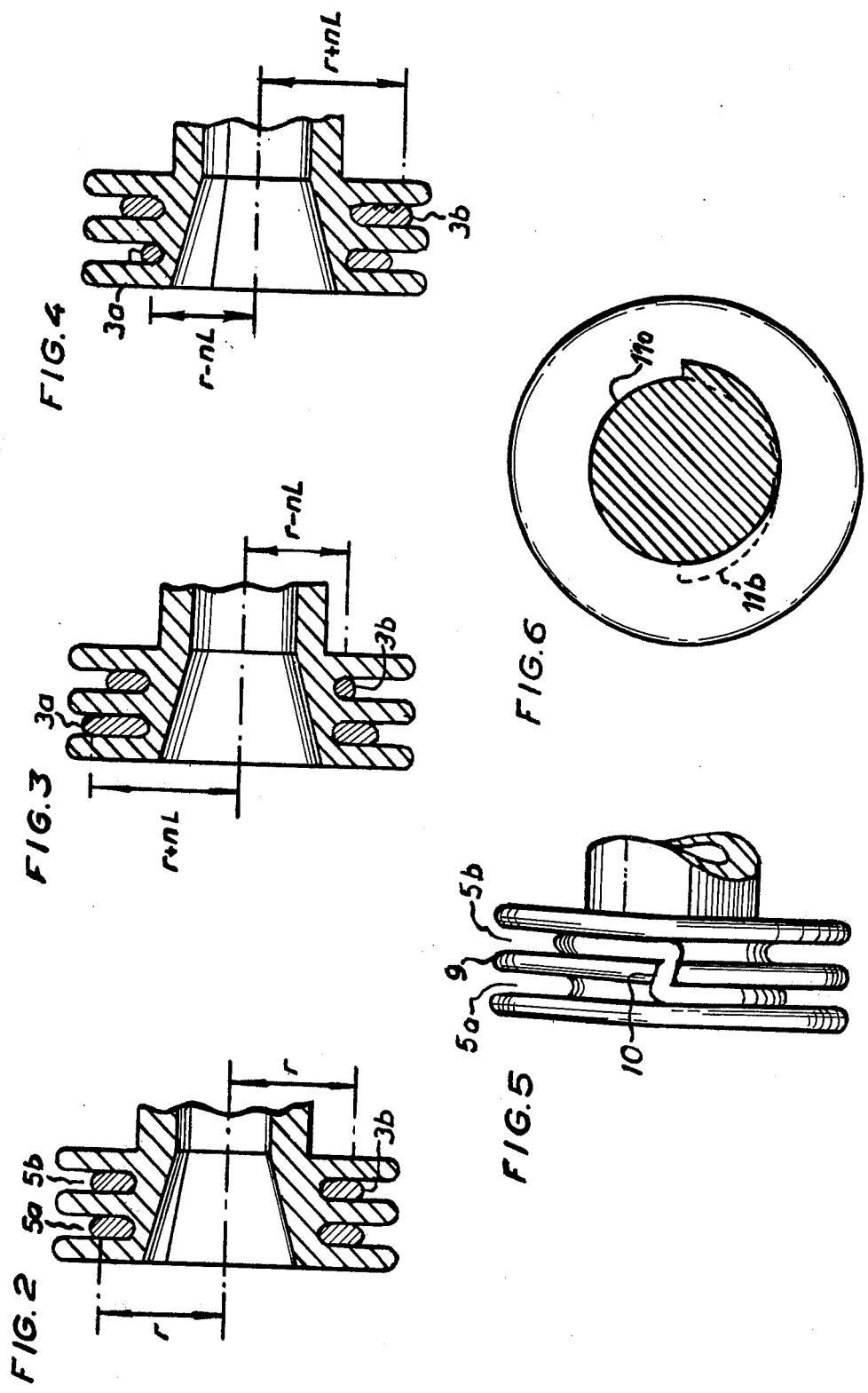

STEERING GEAR

This invention relates to a steering gear comprising a body which can be caused to rotate by means of a steering wheel, a pair of bands, wire ropes or chains to be respectively wound onto and unwound from said rotary body, and a steerable member connected to the free ends of the wire ropes.

Steering gears in which the steering wheel and a body, pulley or roller rotatable by means of the steering wheel are connected by bands, wire ropes or chains to the member to be steered have been known for a long time. Since the wire ropes are wound more or less arbitrarily onto a roller the moments of the two rope runs which actuate the roller will be equally large and no restoring effect will be obtained. The same applies when the roller or pulley is formed with two helically extending grooves of equally large depth in which the wire ropes are accommodated.

The object of the invention is to provide a steering gear, so designed that when the steering wheel is turned in one or the other sense the wire rope system exerts a moment which actuates the steering wheel in a restoring sense.

According to the invention, the rotary body is formed with one groove for each wire rope and said grooves which are axially adjoining have a width substantially corresponding to the width of the wire rope, and a depth permitting at least two turns of wire rope to be wound into said grooves, and upon winding of said wire ropes into the grooves the turns of wire rope are arranged to be wound one onto the other so that the position of the incoming rope run relative to the axis of rotation of said body is progressively shifted outwardly, while upon unwinding of said wire ropes the position of the outgoing rope run is progressively shifted inwardly towards said axis in order to provide a moment actuating said body in a restoring sense owing to the difference between the effective winding radii of the wire ropes actuating the body in opposite directions of rotation.

Embodiments of the steering gear according to the invention will be described in greater detail hereinbelow and with reference to the accompanying drawing in which FIG. 1 diagrammatically shows the construction of a steering gear in an articulated vehicle;

FIGS. 2, 3 and 4 show sections of the pulley and the wire ropes in neutral position and after being turned in one and the other sense, respectively, FIG. 5 shows a preferred embodiment of the wire rope attachment as seen from the side;

FIG. 6 shows a radial section of a pulley with a preferred design of the groove bottom.

Figure 1:
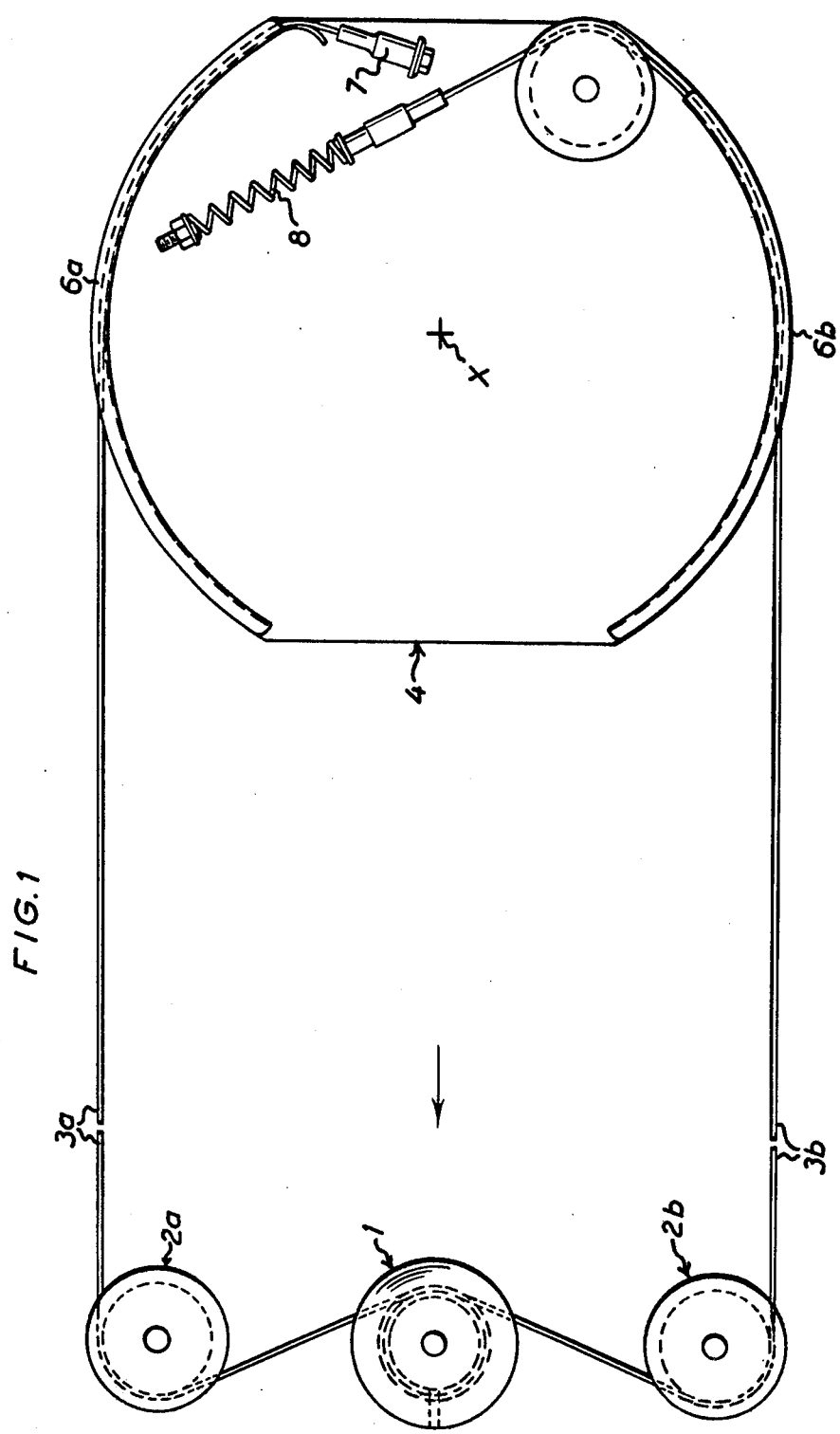

The illustrated construction of the steering gear is intended for use in an articulated self-propelled lawn mower or mini-tractor but can of course be utilized, with slight modifications, for other types of wheeled vehicles and implements and for the actuation of rudders in ships.

A pulley 1 is connected by means of a steering rod to a steering wheel (not shown). 2a and 2b designate a pair of return pulleys, and 1 the member which is to be actuated when the vehicle is to be turned by means of a pair of wire ropes 3a and 3b. The direction of forward propulsion of the contemplated vehicle is towards the left in the drawing.

The pulley 1 is provided with two parallel, annular and axially adjoining grooves 5a and 5b. The grooves are of a depth corresponding to the thickness or width of the wire ropes, and of a depth permitting two or more turns of wire rope to be wound thereinto.

One end of each of the wire ropes 3a and 3b is attached to the pulley at the bottom of the groove therein, while the other end of each wire rope is attached to the member 4. In the embodiment illustrated the member 4 is connected to that part of the vehicle which can articulate about the axis X relative to the part of the vehicle carrying the remaining steering gear, and is formed with arcuate channels 6a and 6b. The end of one wire rope is attached to the member 4 by means of a stretching device 7 while a tension spring 8 is interposed between the end of the other wire rope and the member 4.

FIG. 2 shows the position of the wire ropes in the grooves of the pulley when the steering wheel is in neutral position. Each groove accommodates two turns of wire rope and the outgoing rope runs are at the same radial distance $r$ from the axis of rotation. When the steering wheel and the pulley are turned clockwise, i.e. to bring about a right-hand turn, the wire rope 3a, as will appear from FIG. 3, will be wound onto the pulley while the wire rope 3b will be unwound from the pulley. If the number of turns wound onto the pulley is designated $n$ and the wire rope diameter $L$, the outgoing run of the wire rope 3a will be situated at the radial distance $r + nL$ from the axis of rotation, while the outgoing run of the wire rope 3b will be at the distance $r - nL$ from said axis. When turned in the opposite sense the reverse will be the case, as will appear from FIG. 4, i.e., the wire rope 3a will be at the distance $r - nL$ and the wire rope 3b at the distance $r + nL$ from said axis.

The differences in radii arising when the vehicle is turned will give rise to a moment actuating the pulley and tending to restore the pulley to the neutral position, i.e. for driving straight ahead.

The wire rope can be attached in several different ways. A preferred way is illustrated in FIG. 5 and this way int.al. brings the advantage that an undivided wire rope can be used. A partition 9 separating the two wire rope grooves 5a, 5b is provided with a recess 10 directed obliquely rearwardly to the respective direction of pull, and the wire rope is placed in said recess so as to extend in Z-shape therethrough. The recess 10 is of a width conforming to the wire thickness and provides a self-locking effect owing to its orientation.

In the construction as hitherto described the body will have to be turned a full revolution before a change occurs in the positions of the wire rope runs which respectively enter and leave the groove. If it is desired to bring about an immediate and uniform change of position the groove bottoms 11a and 11b can, as will appear from FIG. 6, be given helical shape comprising a pitch per turn which correponds to the thickness of the wire rope. This will give a uniformly increasing and decreasing moment without the step changes that may occur if the groove bottom is of cylindrical shape and the wire rope climbs but once per turn.

A round wire rope has been illustrated in the drawing. It is obvious, however, that for instance two or more parallel slender wire ropes, a band, a roller chain or like means can be used instead without any modification of the function and effect of the steering gear.

Figure 7:
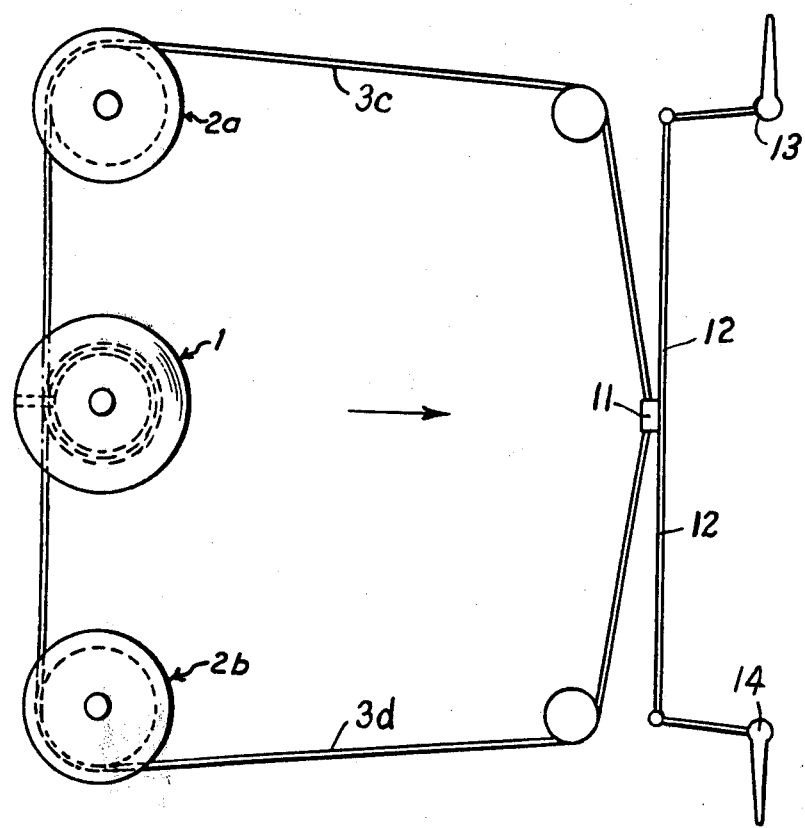
FIG. 7 shows the invention associated with another type of steering gear.

It will be realized that the running of the wire ropes can be varied in different types of steering gears. It is diagrammatically indicated in FIG. 7 how runs 3c and 3d of the wire ropes may be run in a vehicle with a conventional steering gear. The wire ropes are connected by member 11 to a tie rod 12 which is connected at its opposite ends to rocker arms 13 and 14. In this case, the direction of propulsion of the vehicle is toward the right in the drawing.

The above embodiment of the invention was described for purposes of illustration rather than limitation. All possible variations and modifications of the invention are understood as being included within the scope of the appended claims.

What I claim and desire to secure by Letters Patent is:

1. A steering gear comprising a body which can be caused to rotate by means of a steering wheel or the like, a pair of elongated flexible means such as bands, wire ropes or chains each having one end wound onto and unwound from said rotary body, and steerable means connected to the opposite ends of the flexible means, wherein the rotary body is formed with circumferential guide means for each of said flexible means, each of said guide means having a width substantially corresponding to the width of the flexible means and a depth permitting at least two turns of the flexible means to be wound therein, and upon winding of said flexible means into the circumferential guide means the turns of the flexible means overlie each other so that the position of an incoming flexible means relative to the axis of rotation of said body is progressively shifted outwardly, while upon unwinding of said flexible means the position of the outgoing flexible means is progressively shifted inwardly towards said axis in order to provide a moment actuating said body in a restoring sense owing to the difference between the effective winding radii of the flexible means actuating the rotary body in opposite directions of rotation.

2. A steering gear as claimed in claim 1, wherein at least one of the elongated flexible means is connected via a resilient stretching device to the steerable means.

3. A steering gear as claimed in claim 1, wherein the circumferential guide means are grooves in the rotatable body, said grooves having bottoms which extend helically in opposite directions with a pitch per turn which conforms to the thickness of the elongated flexible means.

4. A steering gear as claimed in claim 1 wherein the rotatable body is provided with a recess which interconnects said circumferential guide means, said pair of elongated flexible means being portions of a unitary elongated flexible member which extends through said recess.

* * * * *